United States Patent
Zheng et al.

(10) Patent No.: US 10,489,405 B2
(45) Date of Patent: Nov. 26, 2019

(54) DATA EXTRACTION USING OBJECT RELATIONSHIP TEMPLATES

(71) Applicant: salesforce.com, inc., San Francisco, CA (US)

(72) Inventors: Zuye Zheng, San Francisco, CA (US); Amruta Moktali, San Francisco, CA (US); Suyog Anil Deshpande, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 302 days.

(21) Appl. No.: 14/820,470

(22) Filed: Aug. 6, 2015

(65) Prior Publication Data

US 2016/0179897 A1    Jun. 23, 2016

Related U.S. Application Data

(60) Provisional application No. 62/094,014, filed on Dec. 18, 2014.

(51) Int. Cl.
| | |
|---|---|
| *G06F 16/00* | (2019.01) |
| *G06F 16/2455* | (2019.01) |
| *G06F 16/248* | (2019.01) |
| *G06F 16/28* | (2019.01) |

(52) U.S. Cl.
CPC ...... *G06F 16/24568* (2019.01); *G06F 16/248* (2019.01); *G06F 16/284* (2019.01); *G06F 16/289* (2019.01)

(58) Field of Classification Search
CPC ......... G06F 17/30516; G06F 17/30554; G06F 17/30595; G06F 17/30607; G06F 17/30306; G06F 16/24568; G06F 16/289; G06F 16/284; G06F 16/248
USPC ......... 707/754, 687, 722; 715/810; 717/100, 717/125
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

*Primary Examiner* — Monica M Pyo
(74) *Attorney, Agent, or Firm* — Jaffrey, Watson, Mendonsa & Hamilton, LLP

(57) ABSTRACT

Methods, systems, apparatus, and machine-readable media facilitate a system for data extraction using object relationship templates. In an enterprise cloud computing environment, a system for data extraction using object relationship templates is implemented to dynamically generate data extraction flows from one or more enterprise data sources quickly and accurately in response to changing business needs. Object relationship templates representing all of a portion of a data extraction flow are created and stored for reuse either alone or in combination with other data extraction flows and other templates to create new data extraction flows. Corresponding methods, systems, apparatus, and machine-readable media for data extraction using object relationship templates can be implemented in servers supporting the enterprise cloud computing environment.

12 Claims, 13 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,730,478 B2 * | 6/2010 | Weissman ............ G06F 21/6218 717/100 |
| 8,244,714 B1 * | 8/2012 | Collins ............. G06F 17/30554 707/714 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2010/0083172 A1 * | 4/2010 | Breeds ................ G06F 3/0482 715/810 |
| 2010/0192067 A1 * | 7/2010 | Casalaina ........ G06F 17/30525 715/742 |
| 2011/0258603 A1 * | 10/2011 | Wisnovsky ......... G06F 11/3612 717/125 |
| 2011/0295814 A1 * | 12/2011 | Kothari ............ G06F 17/30306 707/687 |
| 2013/0103701 A1 * | 4/2013 | Vishnubhatta .... G06F 17/30595 707/754 |
| 2013/0117291 A1 * | 5/2013 | Roy-Faderman ........ G06F 8/24 707/756 |

* cited by examiner

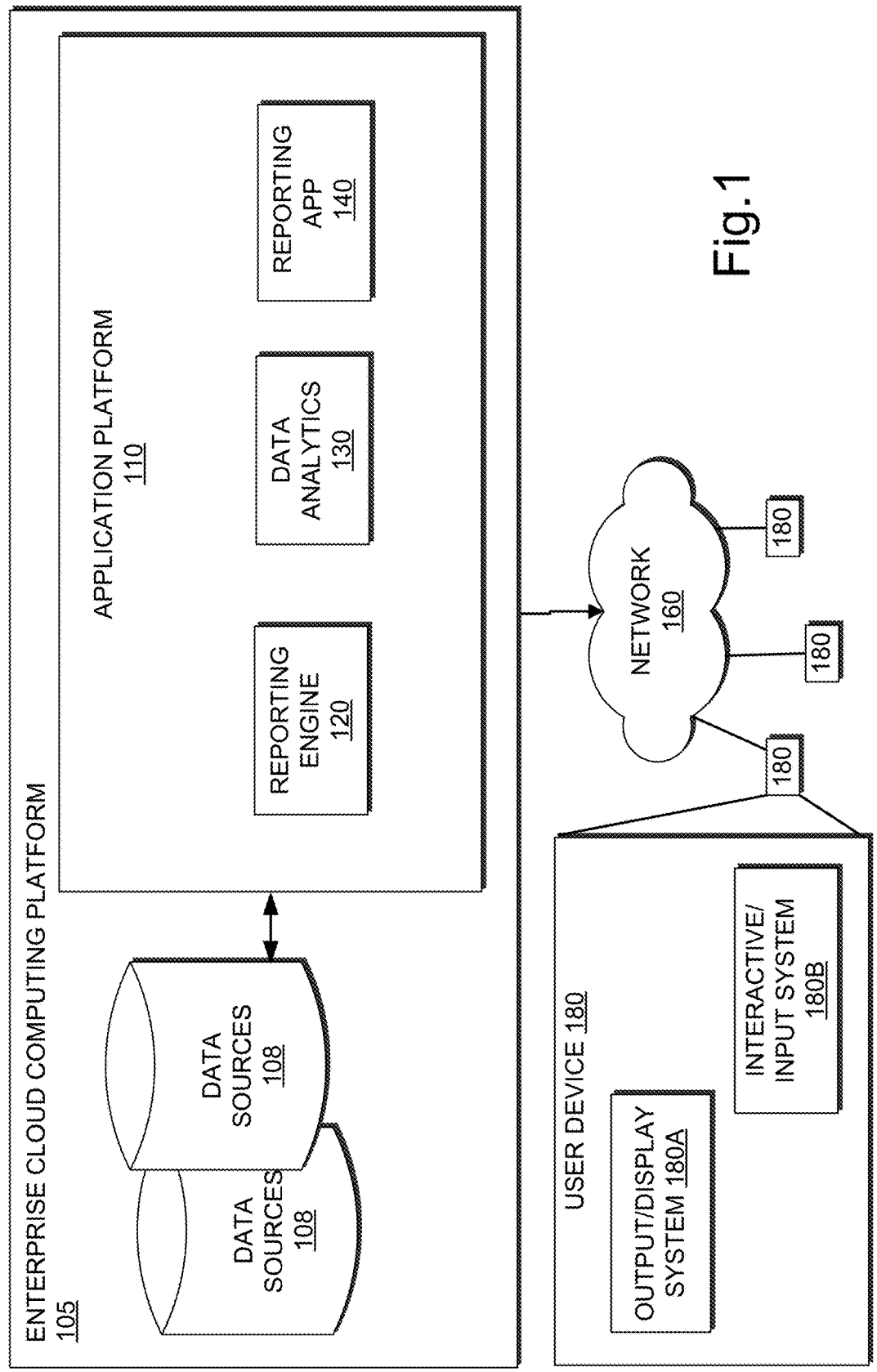

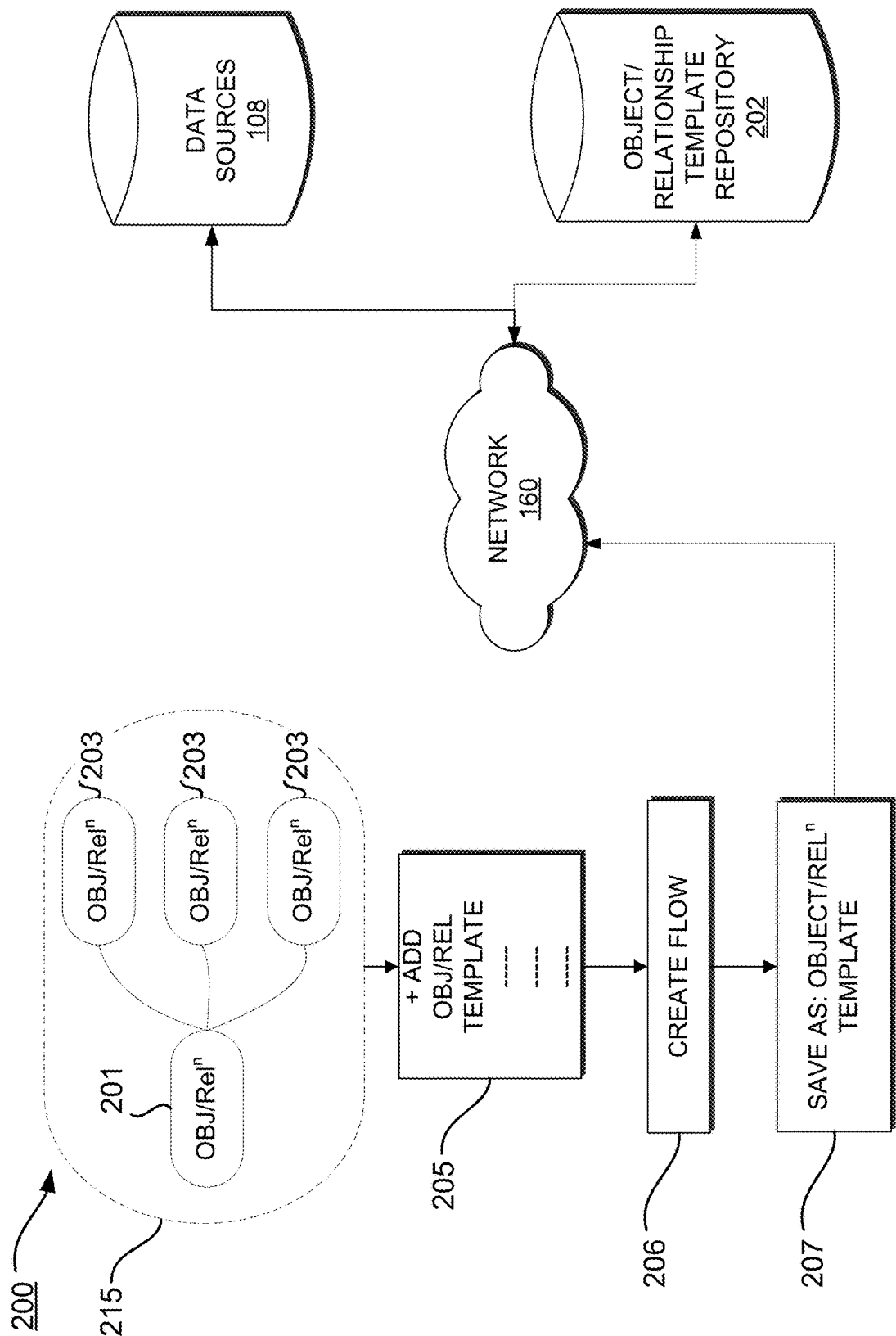

DATA EXTRACTION USING OBJECT RELATIONSHIP TEMPLATES

CROSS-REFERENCE TO RELATED APPLICATIONS

This application claims the benefit of U.S. Provisional Application No. 62/094,014, filed on Dec. 18, 2014, the entire contents of which are hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to enterprise cloud computing platforms for extracting data for analysis and reporting.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Enterprises are increasingly relying on enterprise cloud computing services to minimize the cost of developing software applications. One of the challenges in developing software applications is extracting meaningful subsets of data from the large amounts of data that enterprises generate for use in business analytics and reporting applications.

To extract meaningful subsets of data, analysts typically expend significant effort modeling the data for use in the business analytics and reporting applications. In order to be responsive to changing business needs, the modeling process may need to be repeated multiple times with alterations depending on the application.

BRIEF DESCRIPTION OF THE DRAWINGS

The present invention is illustrated by way of example and not limitation in the figures of the accompanying drawings, in which like references indicate similar elements and in which:

FIG. 1 illustrates an overview of a system for extracting data using object relationship templates in an enterprise cloud platform operating environment according to one embodiment;

FIGS. 2A-2B are a diagrammatic overview illustrating a process for extracting data using object relationship templates according to one embodiment;

DETAILED DESCRIPTION

Figure 2B:
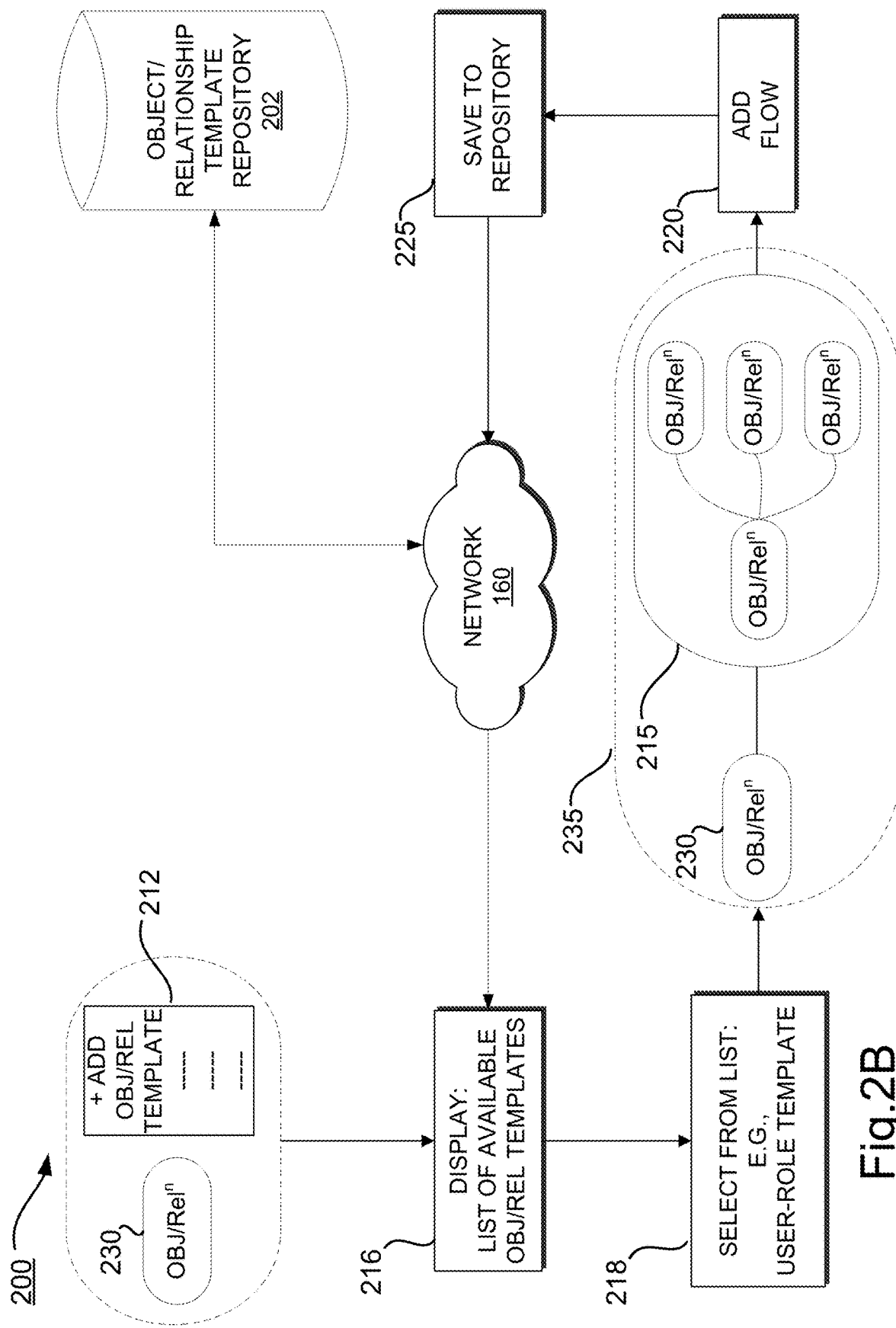

In keeping with the foregoing observations, embodiments of a system for extracting data using object relationship templates is described in which an object relationship template can be saved and reused when developing a data extraction flow. In one embodiment, the object relationship template defines a full or partial set of object relationships. In one embodiment the object relationship template can be used to create a new data extraction flow or to edit an existing data extraction flow. Extracting data using object relationship templates advantageously ensures consistency and accuracy in the extraction of data as well as increases the efficiency with which the data extraction flows can be created and edited to meet changing business needs.

Embodiments of methods and systems are described for extracting data using object relationship templates on computing devices in an enterprise cloud computing environment, including in an on-demand services and multi-tenant environment. Embodiments may be implemented on a platform that enables mobile applications to be built and deployed on mobile devices, such as tablet computers, smartphones, wearable devices, touch-enabled devices, etc., operating on any number and type of operating systems.

In one embodiment, using an application running on a platform provided by an enterprise cloud platform operating environment, such as HEROKU®, or Salesforce1®, methods and systems for extracting data using object relationship templates on computing devices may employ events or features associated with images, such as HyperText Markup Language ("HTML"), etc., and components, such as Salesforce Wave™ or Visualforce® components, SOQL and APEX components etc., that may rely on data residing in the enterprise cloud or in an on-demand services environment. It is contemplated that embodiments are not limited to any particular number or type of operating systems, such as Apple® iOS®, Android®, etc. Similarly, it is contemplated that any number and type of libraries (e.g., jQuery, AngularJS, KineticJS, NodeJS, ExpressJS, HammerJS, iScroll, etc.) may be used to generate an application for data extraction using object relationship templates on computing devices in the enterprise cloud or on-demand services environment.

It is contemplated that embodiments and their implementations are not merely limited to use in a multi-tenant database system ("MTDBS") and can be used in other environments, such as a client-server system, a mobile device, a personal computer (PC), a web services environment, etc. However, for the sake of brevity and clarity, throughout this document, embodiments are described as being used in a multi-tenant database system, such as Salesforce.com®, which is to be regarded as an example of an on-demand services environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Embodiments are described in which techniques for facilitating extracting data using object relationship templates in an on-demand services environment are implemented in a system having an application server providing a front end for an on-demand database service capable of supporting multiple tenants. However it should be understood that the described embodiments are not limited to multi-tenant databases or deployment on application servers. Embodiments may be practiced using other database architectures, i.e., ORACLE®, DB2® by IBM and the like without departing from the scope of the embodiments claimed.

FIG. 1 illustrates an overview of an exemplary system 100 for extracting data using object relationship templates operating in an enterprise cloud computing platform 105 in accordance with one embodiment. The system 100 includes, among others, multiple data sources 108 and an application platform 110 that includes, among other components, a reporting app 140 that operates in conjunction with the reporting engine 120 and data analytics 130, all of which are provided as part of the enterprise cloud computing platform 105.

In one embodiment, the data analytics 130 component of the application platform 110 operates to extract subsets of data, referenced herein as a dataset, from one or more data sources 108 in accordance with an embodiment of the system for extracting a dataset using object relationship templates. The reporting engine 120 and reporting app 140 components process the extracted dataset to generate reports that are transmitted over network 160 to user device 180. The user device 180 displays and interacts with the generated reports using the device's output/display system 180A and interactive input system 180B. In some embodiments the extracted dataset may be transmitted to the user device 180 over network 160 for report generation directly on user device 180.

FIGS. 2A-2B illustrate further detail of an overview of an exemplary system 100 for extracting data using object relationship templates operating in an enterprise cloud computing platform 105 in accordance with one embodiment. For example, in the illustrated embodiment of FIG. 2A, a process 200 includes a process 205 to add an object relationship template 215 that is visually represented on a user device as one data object 201 in relation to three additional objects 203. The object relationship template 215 includes, among other data, the fields, security transforms and/or other filters associated with the data objects, collectively referred to as a set of object-relationships. In a typical embodiment, the set of object-relationships is used to create a data extraction flow, the data extraction flow governing the extraction of a dataset from the data sources 108. As illustrated, the first object relationship template 215 can be saved 207 from the user device in response to user input as a template in an object/relationship template repository 202 via network 160 and assigned a name and a description such as "User-Role" template.

In one embodiment, the process 200 further includes a process 206 to create the data extraction flow, or data flow definition, for extracting a dataset using the object relationship template 215. The data flow definition created by the create flow process 206 can then be used to extract the dataset from the data sources 108 in accordance with the object relationship template 215. In a typical embodiment the dataset is created the next time a dataflow runs against the data sources 108 and/or refreshed each time the dataflow runs.

With reference to FIG. 2B, in one embodiment the process 200 further includes a process to add an object-relationship template to an existing visual representation of a set of object relationships, also referred to as a visual representation of a data extraction flow. For example, the process includes process 212 to add an object relationship template, such as the object relationship template 215 saved as illustrated in FIG. 2A, to an existing object relationship 230. The existing object relationship 230 may be any object that has been included in a visual representation of a data extraction flow currently being displayed to a user on a user device. In one embodiment, the existing object relationship 230 is an object that is the current focus of the data extraction flow displayed to the user.

In a typical embodiment, the process 212 of adding an object relationship template includes a process 216 to generate and display a list of available object relationship templates. For example, the process 216 can include logic to search the repository 202 for any object relationship templates that reference the existing object relationship 230. Alternatively, the process can include logic to display all of the object relationship templates in the repository, but limit selection to only those that reference the existing object relationship 230.

In one embodiment, the process 212 for adding a template to object relationship 230, includes in process 216 and process 218 an interface in which a user can choose a stored object relationship template from a list, such as the object relationship template 215 that was saved under the name "User-Role" template. In other embodiments, other techniques for browsing and selecting object relationship templates in the repository may be used as well, depending on the capabilities of the device being used to display the visual representation of the set of object relationships to the user.

In response to the user selection in processes 216/218, as illustrated, the existing object relationship 230 that was visually represented on the user display and the selected object relationship template 215 are now combined to form a visual representation of object relationship 230 augmented with the object relationships in template 215 to form a new visual representation of a set of object relationships, or data extraction flow, here referenced as object relationship 235. In one embodiment, a user can optionally save the augmented object relationship 235 as a new object relationship template, named and saved in the same manner as object relationship template 215.

In process 220, an add flow process is provided for the user to generate a new data extract flow, or data flow definition, for extracting a dataset using the object relationships 235 that combine object relationship 230 with object relationships in template 215. The data flow definition created by the create flow process 220 can then be used to extract the dataset from the data sources 208 in accordance with the object relationships 235. As before, in a typical embodiment the dataset is created the next time a dataflow runs against the data sources 108 and/or refreshed each time the dataflow runs.

As illustrated in FIGS. 2A-2B, in one embodiment the templates 215, 235 can be used to build whole or partial data extract graphs or sub-graphs, i.e., visual representations of a set of object-relationships, that contain objects, relationships between objects, fields and any other security transforms or filters associated with those objects, relationships and fields, collectively referred to as the set of object-relationships. By creating and saving reusable templates 215, 235, a data analyst can apply one or more templates to build another data extract graph without having to re-create the objects, relationships between objects, fields, transforms or filters already saved in the template. In some embodiments, reusable templates can enable even a non-analyst business user to quickly create a data extract graph without having detailed knowledge of the underlying schema of the one or more data sources 108 from which the data is extracted.

In one embodiment, the process 200 illustrated in FIGS. 2A-2B is implemented as part of a data analytics component 130 of an applications platform 110 operating in an application server computer as part of an enterprise cloud computing platform 105 in communication 160 with a user display device 180 having an output display system 180A and interactive input system 180B operated by a user. However, it should be understood that portions or all of the process 200 may be implemented in other components of the enterprise cloud computing platform without departing from the scope of the claimed embodiments.

FIGS. 3A-3D and 4A-4D illustrate examples of a graphical user interface in which a system for extracting data using object relationship templates may be employed in accordance with an embodiment of the invention. For example, in FIGS. 3A-3D, a dataset builder interface of an analytics interface 300 is illustrated in which data analysts can interact with a data analytics process (such as the above-described process 200 of FIG. 2), to create and edit data extraction flows that model different data objects and joins between objects in a reusable object relationship template (such as the above-described templates 215 and 235 of FIGS. 2A-2B).

Figure 3A:
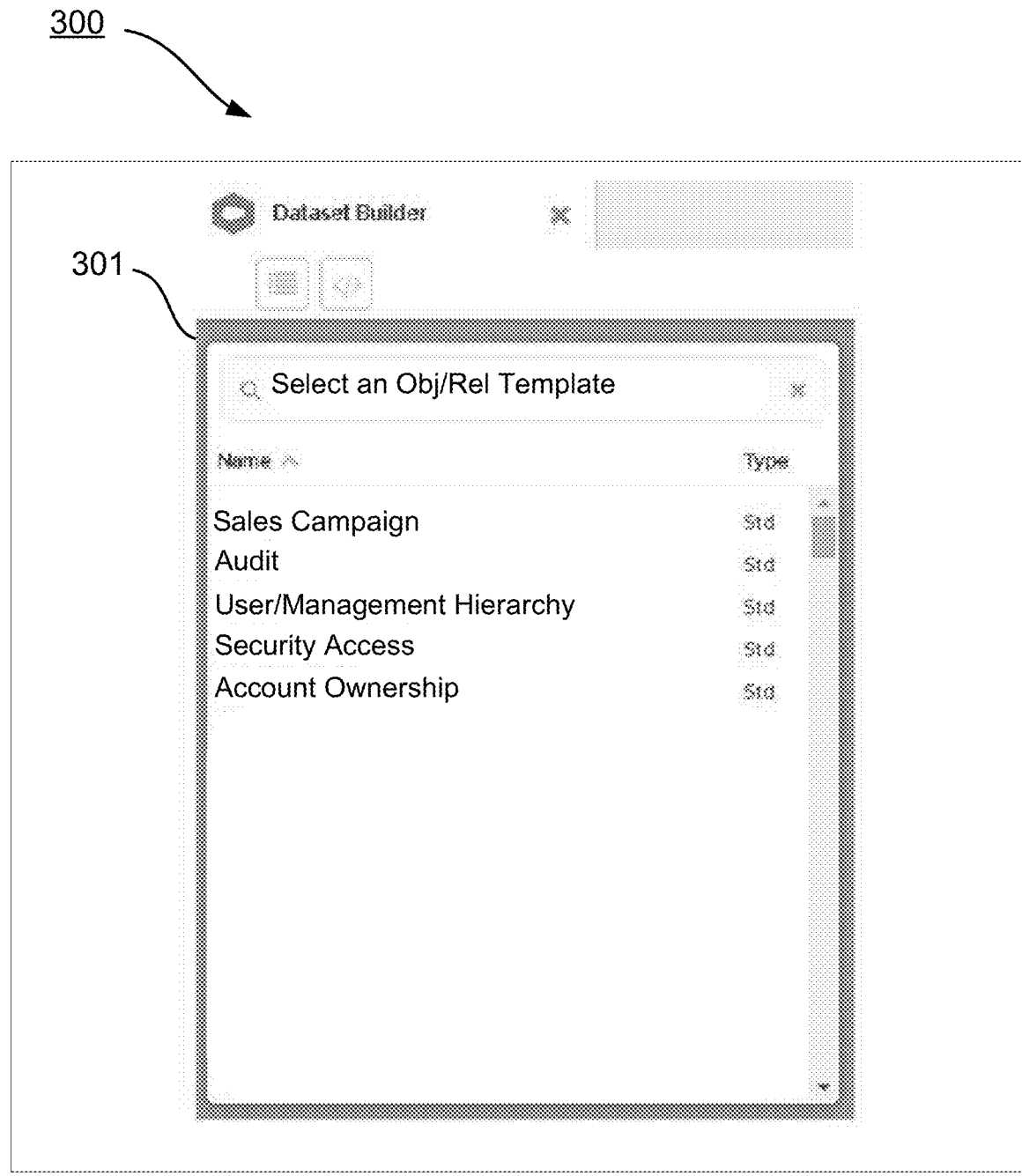
FIGS. 3A-3D illustrate an exemplary graphical user interface (GUI) for extracting data using object relationship templates on a device according to one embodiment.
Figure 3B:
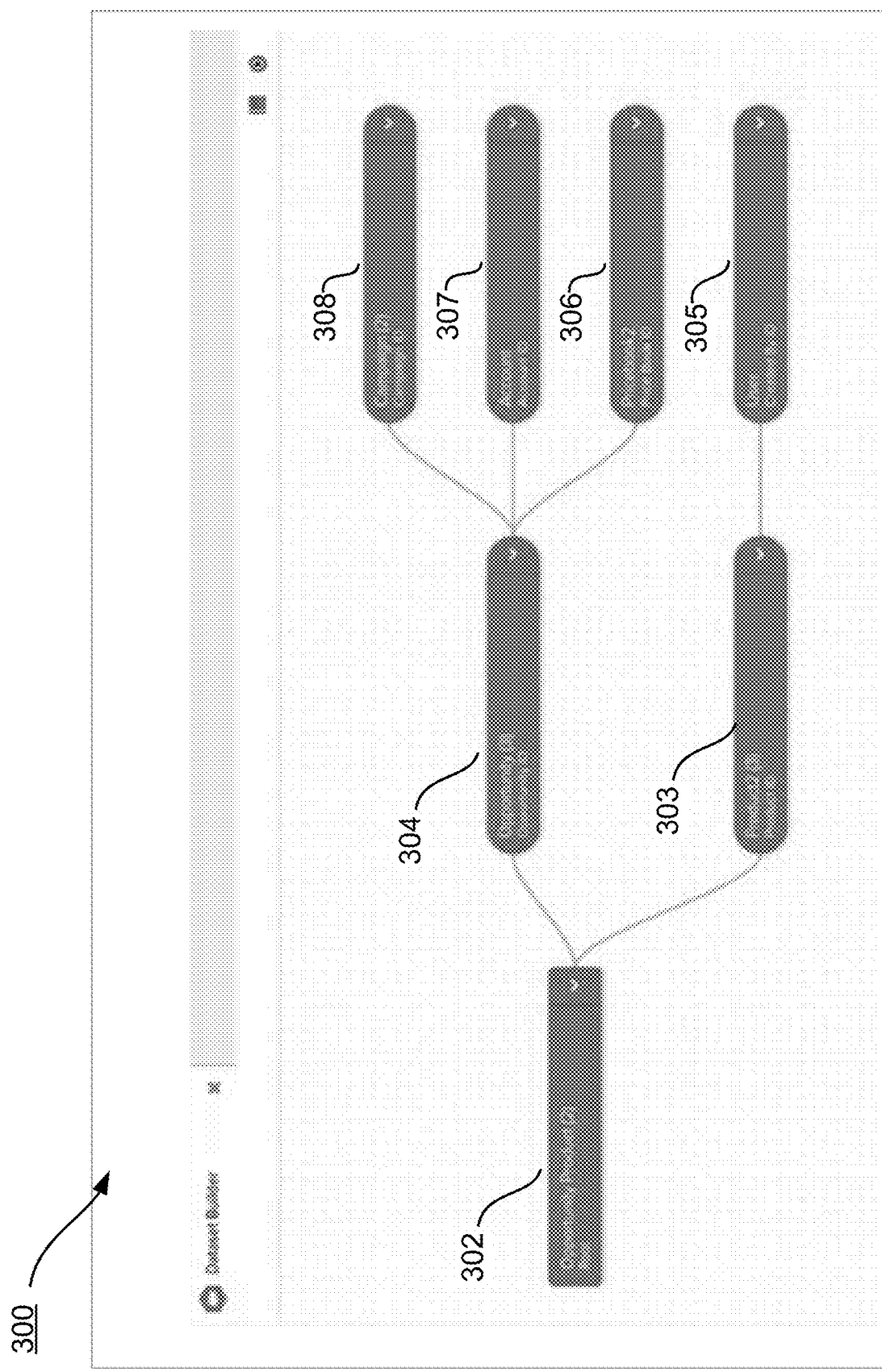

As illustrated in FIG. 3A, a user selection interface 301 is presented to a user to begin the process of selecting an initial object relationship template. Alternatively, the user can begin the process by selecting a specific object. In FIG. 3B, illustrates the result of the user having selected the "Sales Campaign" template listed in interface 301 (FIG. 3A). As shown, the data extraction flow corresponding to the "Sales Campaign" template are visually represented on the interface 300 as a data graph of objects and their relationships to each other. In this example, the objects include typical sales pipeline objects of Opportunities 302/304, Products 303, and Accounts 307 along with other useful objects such as Campaign 308, Pricebook 306 and User 305 objects such as might be associated with an enterprise's sales campaign. All of these objects may have been supplied to the database analyst or other user by selecting a template in which the objects and their relationships have already been saved, such as the aforementioned "Sales Campaign" template, or could have been created from "scratch", i.e. from individual object selection. Once created, a database analyst or other business user can then use the visually represented object relationships to further expand the data extraction flow with other fields to extract or by adding joins with custom objects.

Figure 3C:
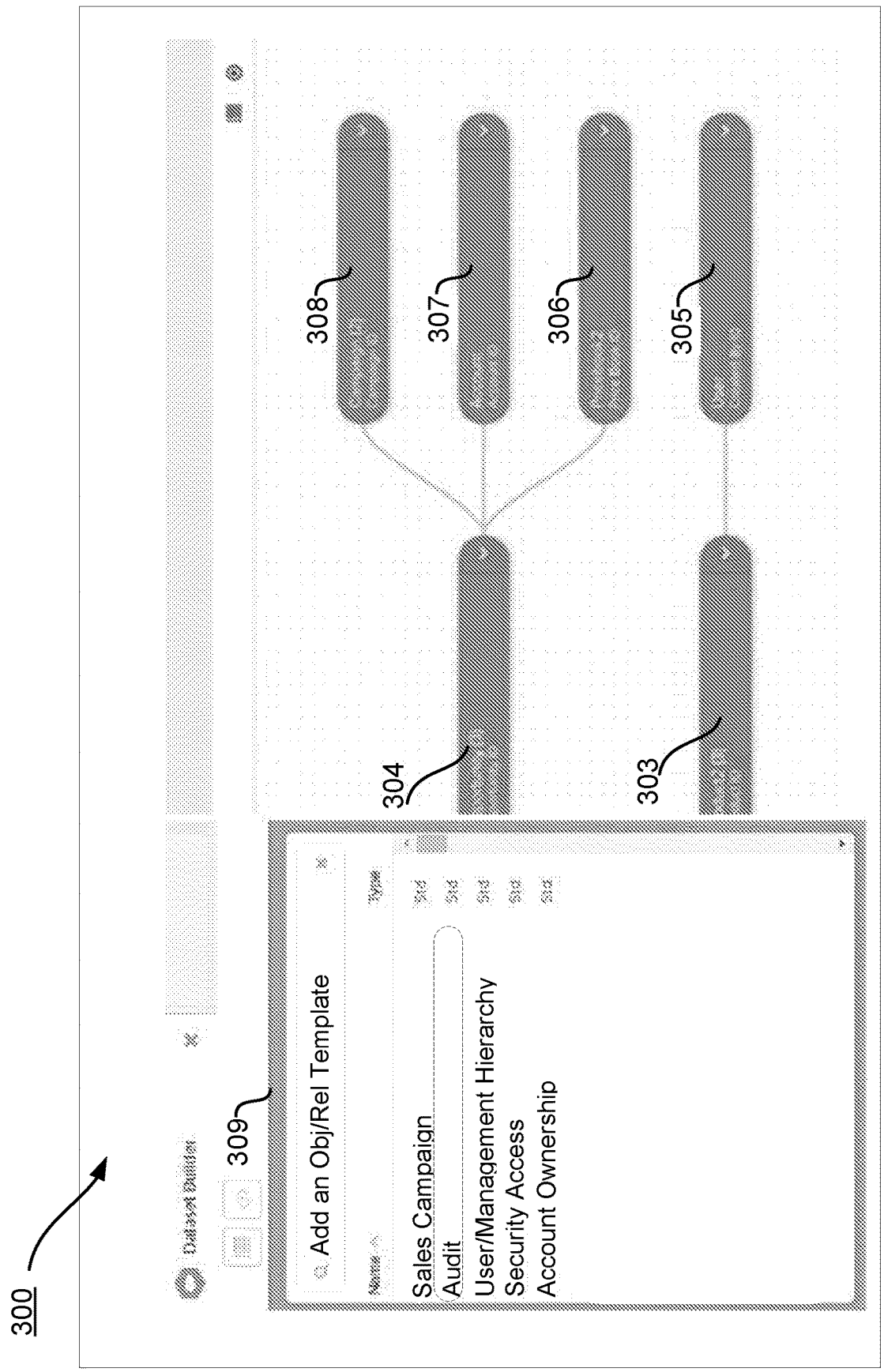

For example, with reference to FIG. 3C, the database analyst or other user may want to augment the "Sales Campaign" data extraction flow that was created in FIG. 3B with some additional audit data. As such, FIG. 3C illustrates a selection interface 309 overlaid on the existing display, and which can be used by a user to select an exemplary partial data graph of objects used in auditing previously saved as an "Audit" template, in order to add the "Audit" template to the existing display of the "Sales Campaign" object relationships.

Figure 3D:
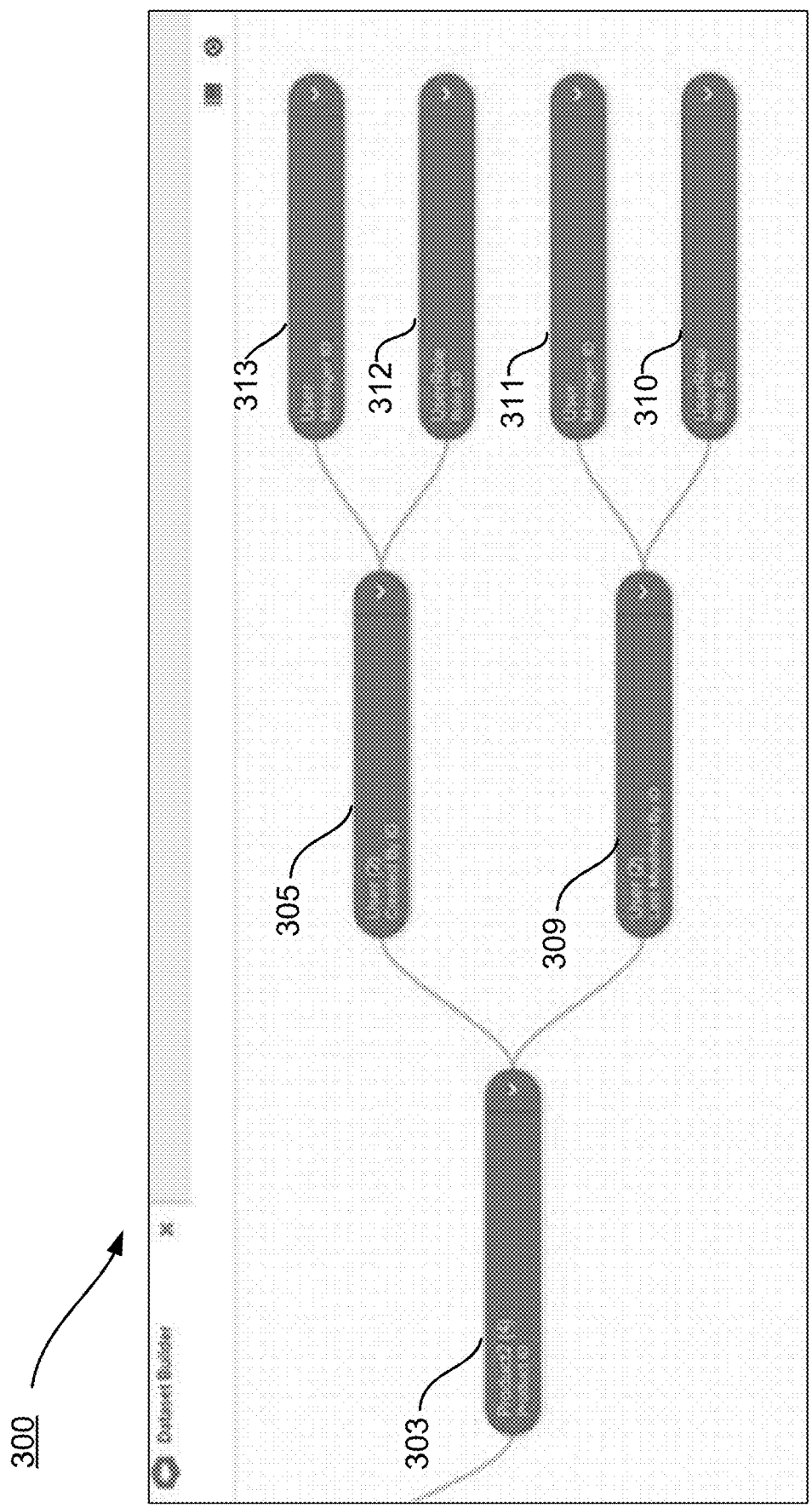

With reference to FIG. 3D, the result of selecting the "Audit" template is illustrated. As shown, the "Audit" template defines a partial data extract graph that extracts audit information for the specified objects, in this case audit information for the product through the Created By User 305 and Last Modified By User 309 that are related to the Product object 303 identified in the "Sales Campaign" data extraction flow illustrated in FIG. 3B-3C. The "Audit" template is further predefined with each of the user's Role and Manager relationships 310-313.

Using the "Audit" template, instead of adding the audit data extraction flow to the sales campaign data extraction flow from "scratch" using individually selected objects, the data analyst or other user can simply select the "Audit" template and add the object relationships represented in the template to the "Sales Campaign" object relationships to create a new data extraction flow. In this manner a new dataset can be built quickly and accurately for use in dynamic on-demand reporting applications related to the sales campaign and auditing functions of the enterprise.

Figure 4A:
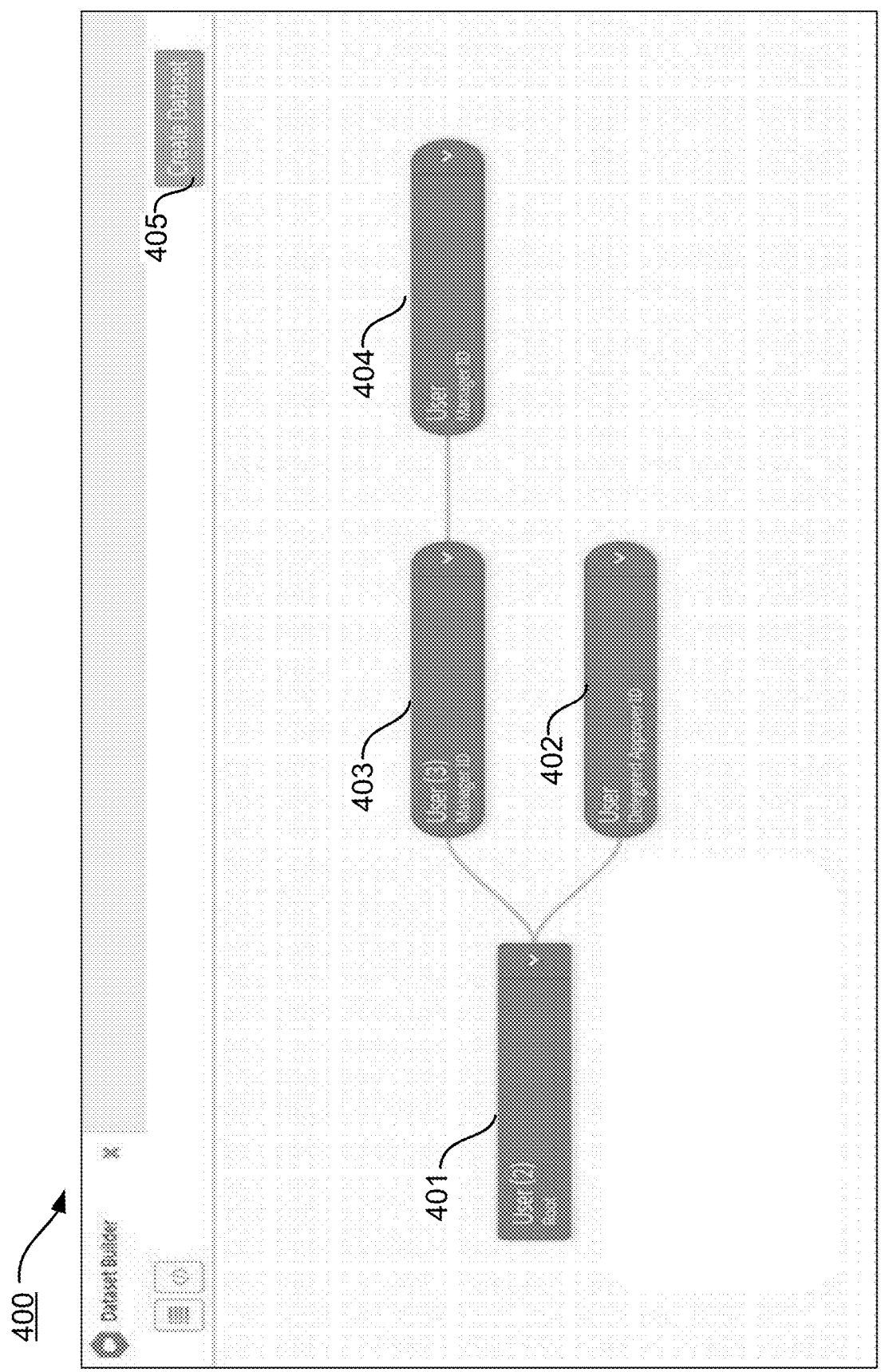
FIGS. 4A-4D illustrate another exemplary GUI for extracting data using object relationship templates on a device according to one embodiment.
Figure 4B:
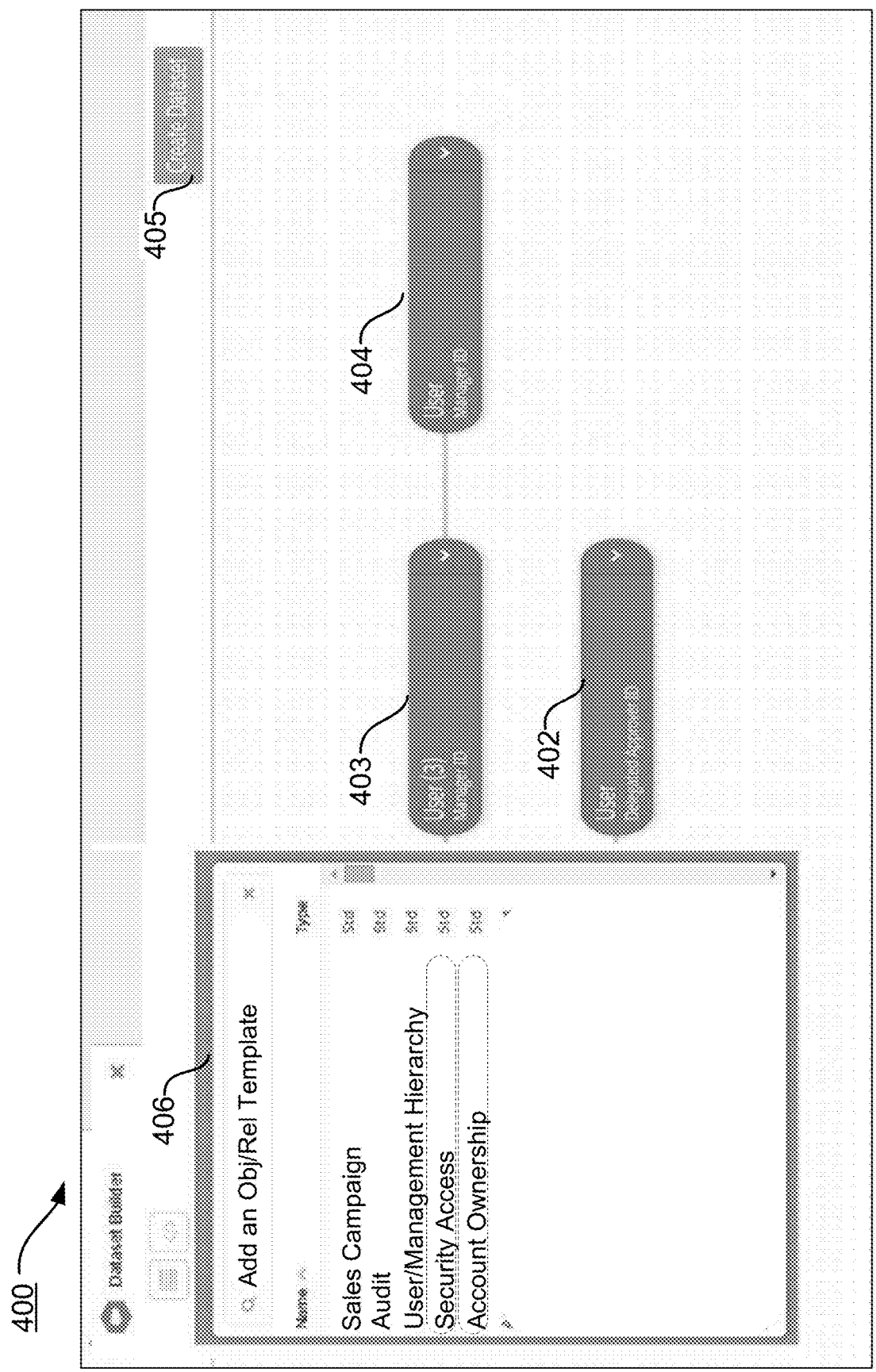

FIGS. 4A-4D illustrate another example interface 400, in which a "User/Management Hierarchy" object relationship template is visually represented in FIG. 4A with four objects 401-404 that each represent a user in the hierarchy. In the illustrated interface 400, the visual representation of the "User/Management Hierarchy" object relationship template is accompanies by a command button "Create Dataset" which can be used to optionally generate the data extraction flow. In this example, however, the user instead activates an interface 406 shown in FIG. 4B to add two additional object relationship templates to the "User/Management Hierarchy," namely the "Security Access" and "Account Ownership" object relationship templates.

Figure 4C:
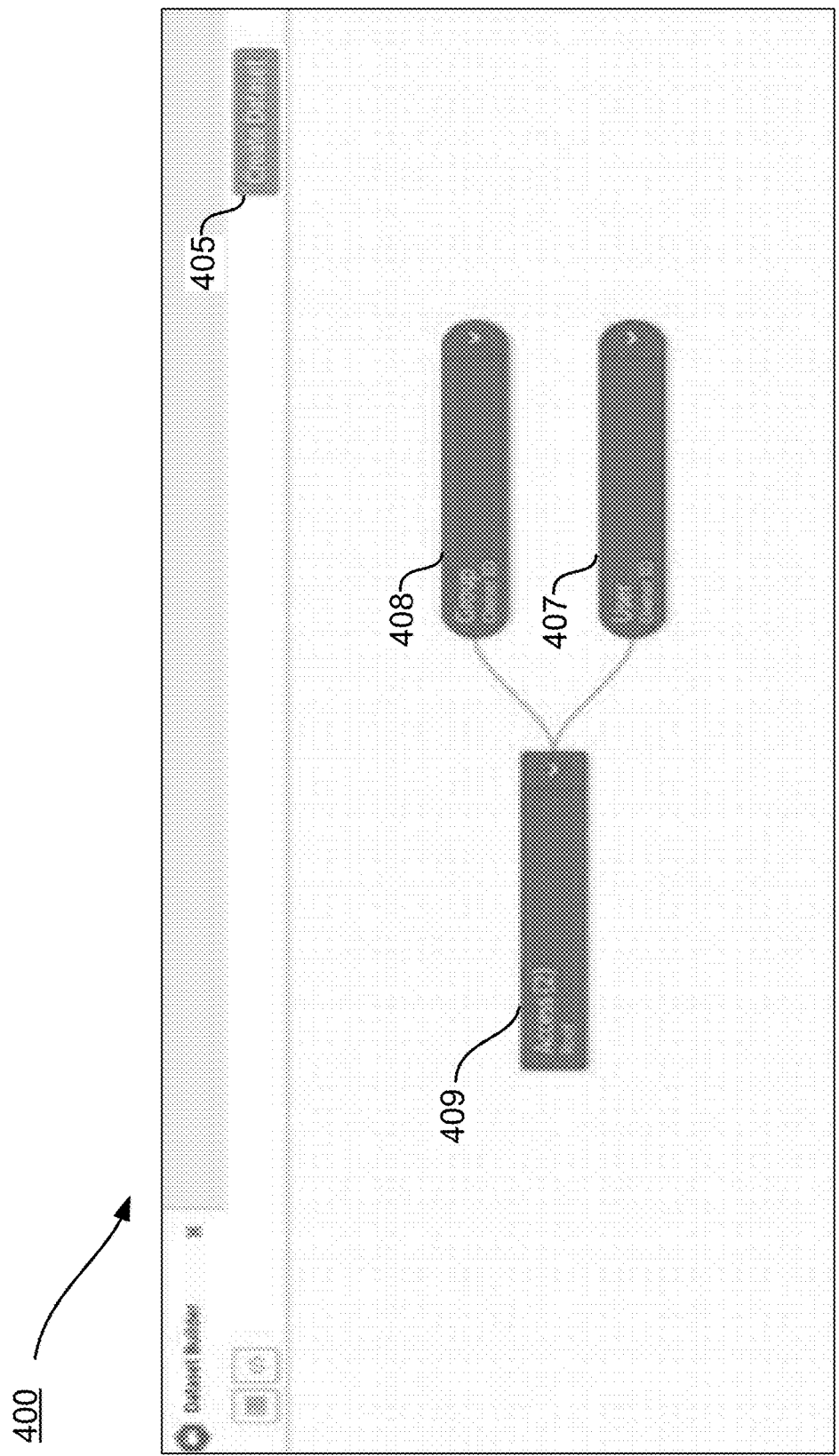

In the embodiment illustrated in FIG. 4C, for example, the result of the selection of the "Security Access" object relationship template causes the interface 400 to display the User Owner ID object 407 for the root User object 401, and further display the additional related objects 408 and 409 in any data extraction flow created from the visual representation of objects in interface 400.

Figure 4D:
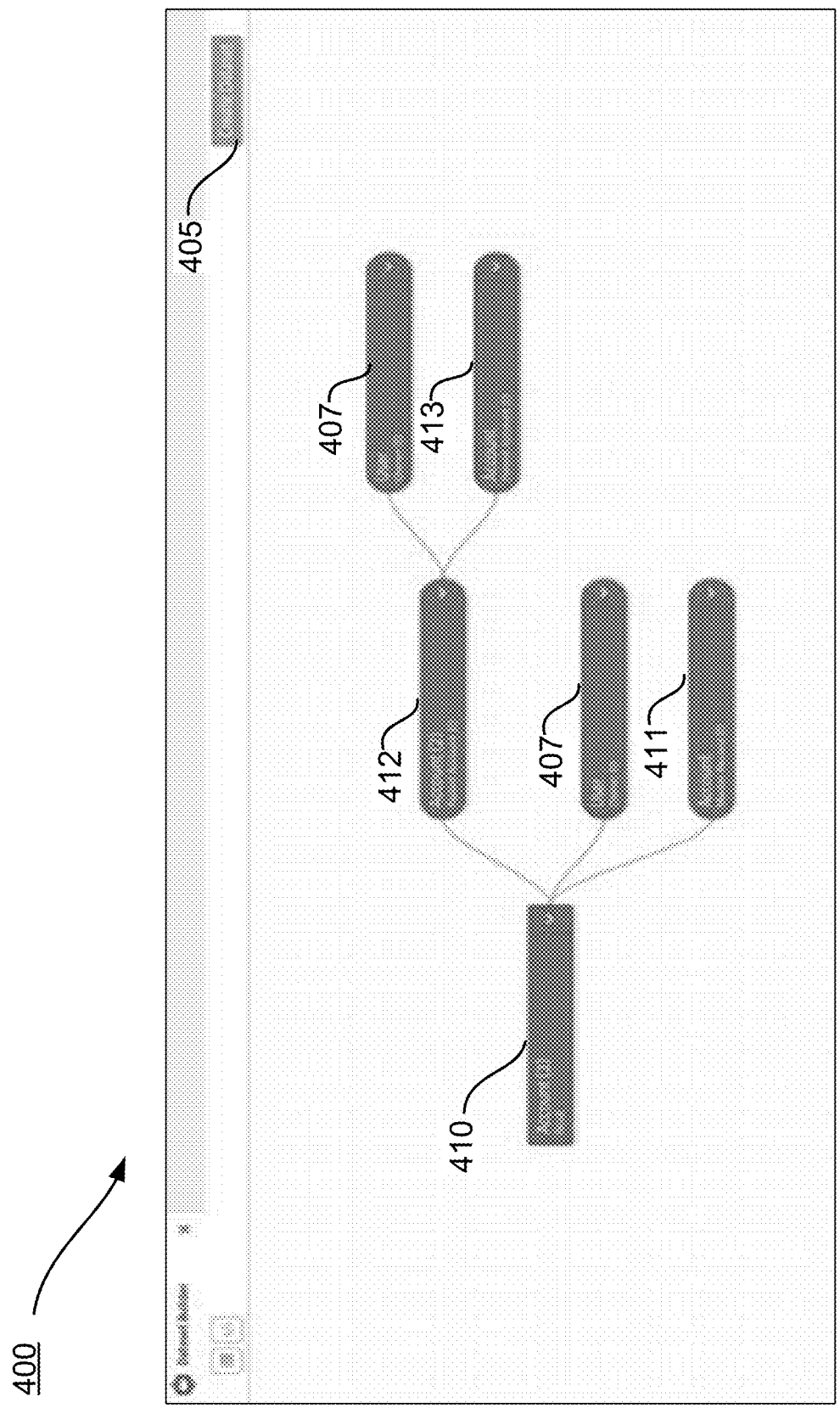

Likewise, in the embodiment illustrated in FIG. 4D, for example, the result of the selection of the "Account Ownership" object relationship template causes the interface 400 to display the instances of the User Owner ID object 407 for the root User object 401, and further display the additional related account objects 410-413 in any data extraction flow created from the visual representation of objects in interface 400. In one embodiment, after all of the desired object relationship templates have been selected and added to the interface 400, the data extraction flow can include all of the object relationships present in the selected templates.

The term "user" may refer to a system user, such as, but not limited to, a software/application developer, a system administrator, a database administrator, an information technology professional, a program manager, product manager, etc. The term "user" may also refer to an end-user, such as, but not limited to, an organization (e.g., a business, a company, a corporation, a non-profit entity, an institution, an agency, etc.) serving as a customer or client of the provider (e.g., Salesforce.com®) of mobile mechanism 110 or an organization's representative, such as a salesperson, a sales manager, a product manager, an accountant, a director, an owner, a president, a system administrator, a computer programmer, an information technology ("IT") representative, etc.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com, Salesforce1®, Apex™ code, JavaScript™, jQuery™, Developerforce™, Visualforce™, Service Cloud Console Integration Toolkit ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

Platforms 105/110 may include server computers (e.g., cloud server computers, etc.), desktop computers, cluster-based computers, set-top boxes (e.g., Internet-based cable television set-top boxes, etc.), and the like. Platforms 105/110 and user devices 180 may include smaller computers, such as mobile computing devices, such as cellular phones including smartphones (e.g., iPhone® by Apple®, BlackBerry® by Research in Motion® Limited, now known and trading as BlackBerry®, etc.), handheld computing devices, personal digital assistants ("PDAs"), etc., tablet computers (e.g., iPad® by Apple®, Galaxy® by Samsung®, etc.), laptop computers (e.g., notebooks, netbooks, Ultrabook™ systems, etc.), e-readers (e.g., Kindle® by Amazon.com®, Nook® by Barnes and Nobles®, etc.), media internet devices ("MID5"), smart televisions, television platforms, wearable devices (e.g., glasses (e.g., Google® Glass® by Google®, watches, bracelets, smartcards, jewelry, clothing items, etc.), media players, Global Positioning System ("GPS")-based navigation systems, cable setup boxes, etc.

The platforms 105/110 and user devices 180 include an operating system ("OS") serving as an interface between any hardware or physical resources of the platforms/devices 105/110/180 and a user. The platforms/devices 105/110/180 further include one or more processors, memory devices, network devices, drivers, or the like, as well as input/output ("I/O") sources, such as output/display system 180A and interactive input system 180B, including touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request" and "message" may be used interchangeably throughout this document. It is to be further noted that terms like "build", "generate", "create", "develop", "make", or the like, and any of their variations, such as "building", "generating", "creating", developing", "making", respectively, may be referenced interchangeably throughout this document.

In a typical environment, the reporting engine 120, data analytics 130 and reporting app components 140 are implemented together with an application installed on a mobile user device 180 having an interactive touch screen display 180A/180B and a mobile operating system, such as an iOS or Android operating system. The application and components 120/130/140 operate together to provide the user of the device 180 with an easy-to-use touch interactive GUI to view, select, and/or otherwise manipulate the visual representation of the object relationship data.

In some embodiments, the reporting engine 120, data analytics 130 and reporting app components 140 can also operate in conjunction with a mobile or stationary user device 180 having a web-browser platform that enables the user of the user device 180 to interact with servers running on platforms 105/110 for secure online access to the visual representation of the object relationship data in a manner similar to an application running on the user device 180.

Figure 5A:
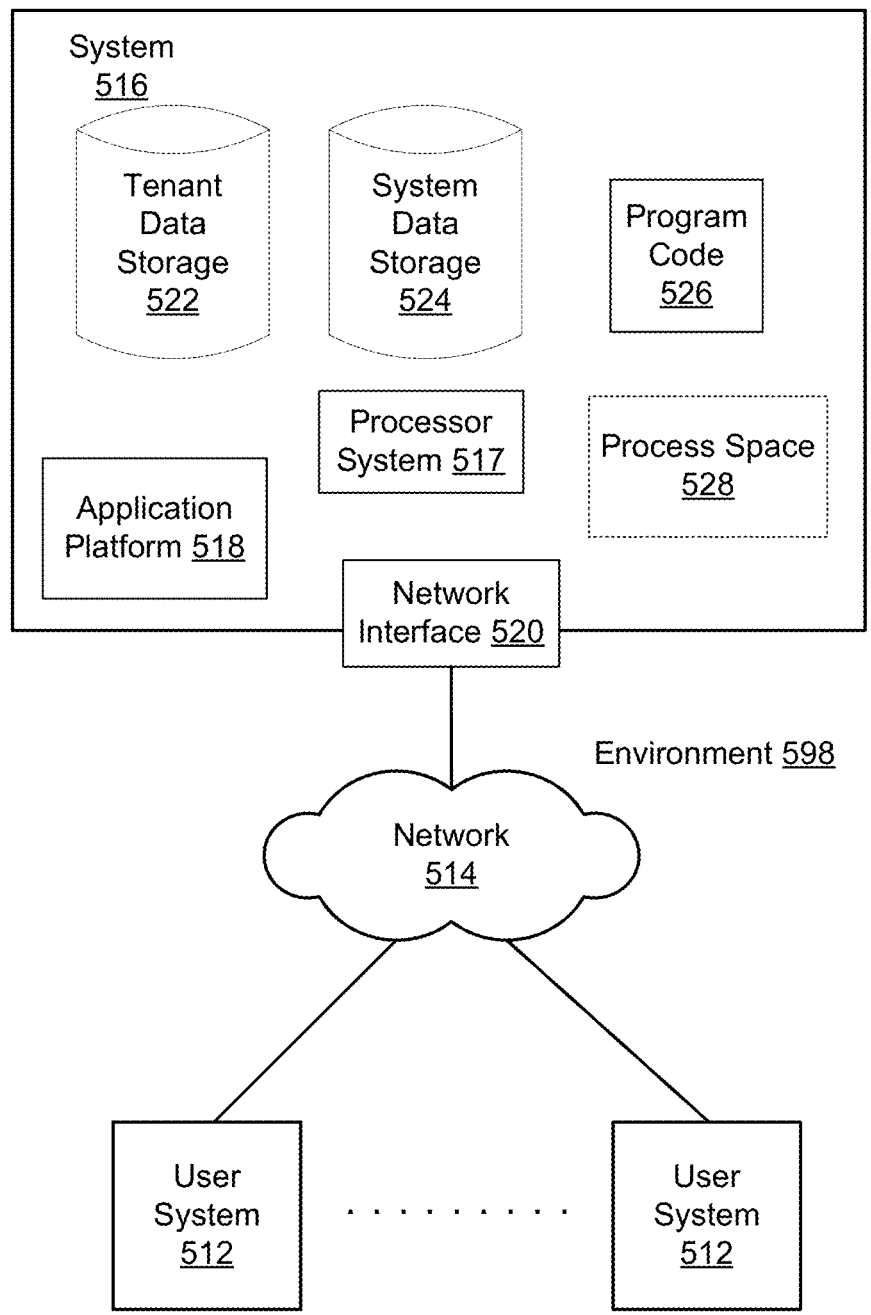
FIGS. 5A-5B illustrate exemplary elements of an operating environment of a system for extracting data using object relationship templates according to one embodiment.

FIG. 5A illustrates a block diagram of an environment 598 in which an on-demand database service that supports a system for data extraction using object relationship templates in accordance with the described embodiments. Environment 598 may include user systems 512, network 514, system 516, processor system 517, application platform 518, network interface 520, tenant data storage 522, system data storage 524, program code 526, and process space 528. In other embodiments, environment 598 may not have all of the components listed and/or may have other elements instead of, or in addition to, those listed above.

Environment 598 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5A (and in more detail in FIG. 5B) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" is used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5A, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5A, including a network interface 520, application platform 518, tenant data storage 522 for tenant data 523 (in FIG. 5B), system data storage 524 for system data 525 (in FIG. 5B) accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5A include conventional, well-known elements that are explained only briefly here. For example, each user system 512 may include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units.

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5B:
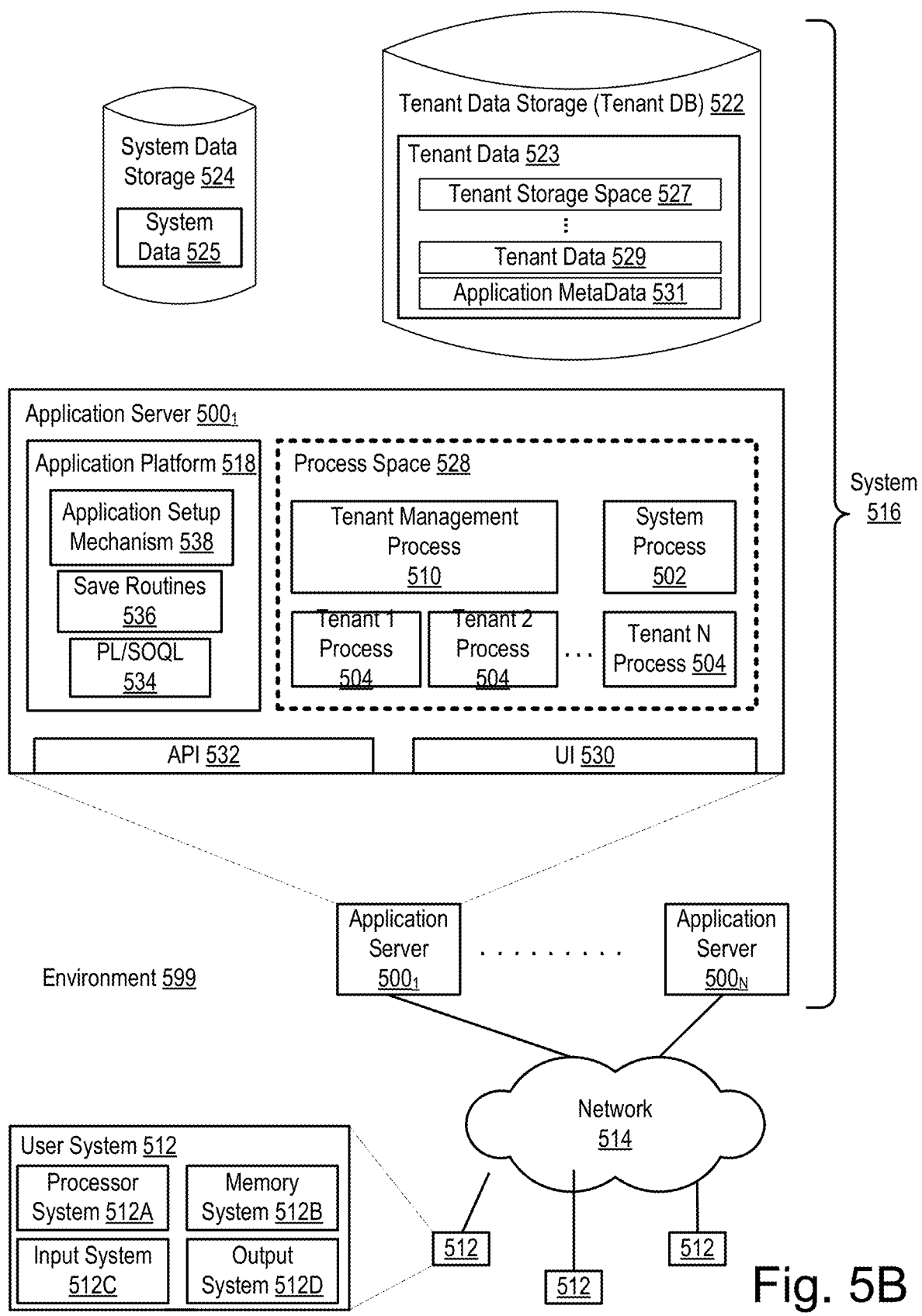

FIG. 5B illustrates another block diagram of an embodiment of elements of FIG. 5A and various possible interconnections between such elements in accordance with the described embodiments. FIG. 5B also illustrates environment 599. However, in FIG. 5B, the elements of system 516 and various interconnections in an embodiment are illustrated in further detail. More particularly, FIG. 5B shows that user system 512 may include a processor system 512A, memory system 512B, input system 512C, and output system 512D. FIG. 5B shows network 514 and system 516. FIG. 5B also shows that system 516 may include tenant data storage 522, having therein tenant data 523, which includes, for example, tenant storage space 527, tenant data 529, and application metadata 531. System data storage 524 is depicted as having therein system data 525. Further depicted within the expanded detail of application servers $500_{1-N}$ are User Interface (UI) 530, Application Program Interface (API) 532, application platform 518 includes PL/SOQL 534, save routines 536, application setup mechanism 538, process space 528 includes system process space 502, tenant 1-N process spaces 504, and tenant management process space 510. In other embodiments, environment 599 may not have the same elements as those listed above and/or may have other elements instead of, or in addition to, those listed above.

User system 512, network 514, system 516, tenant data storage 522, and system data storage 524 were discussed above in FIG. 5A. As shown by FIG. 5B, system 516 may include a network interface 520 (of FIG. 5A) implemented as a set of HTTP application servers 500, an application platform 518, tenant data storage 522, and system data storage 524. Also shown is system process space 502, including individual tenant process spaces 504 and a tenant management process space 510. Each application server 500 may be configured to tenant data storage 522 and the tenant data 523 therein, and system data storage 524 and the system data 525 therein to serve requests of user systems 512. The tenant data 523 might be divided into individual tenant storage areas (e.g., tenant storage space 527), which can be either a physical arrangement and/or a logical arrangement of data. Within each tenant storage space 527, tenant data 529, and application metadata 531 might be similarly allocated for each user. For example, a copy of a user's most recently used (MRU) items might be stored to tenant data 529. Similarly, a copy of MRU items for an entire organization that is a tenant might be stored to tenant storage space 527. A UI 530 provides a user interface and an API 532 provides an application programmer interface into system 516 resident processes to users and/or developers at user systems 512. The tenant data and the system data may be stored in various databases, such as one or more Oracle™ databases.

Application platform 518 includes an application setup mechanism 538 that supports application developers' creation and management of applications, which may be saved as metadata into tenant data storage 522 by save routines 536 for execution by subscribers as one or more tenant process spaces 504 managed by tenant management process space 510 for example. Invocations to such applications may be coded using PL/SOQL 534 that provides a programming language style interface extension to API 532. Invocations to applications may be detected by one or more system processes, which manage retrieving application metadata 531 for the subscriber making the invocation and executing the metadata as an application in a virtual machine.

Each application server 500 may be communicably coupled to database systems, e.g., having access to system data 525 and tenant data 523, via a different network connection. For example, one application server $500_1$ might be coupled via the network 514 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 512 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user may hit three different application servers 500, and three requests from different users may hit the same application server 500. In this manner, system 516 is multi-tenant, in which system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 500 to request and update system-level and tenant-level data from system 516 that may require sending one or more queries to tenant data storage 522 and/or system data storage 524. System 516 (e.g., an application server 500 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A computer-implemented method to present a graphical depiction of a definition for extracting data from a data store, the method comprising: in a device having a display interface, the device in communication with a data source:
   displaying, on the display interface, a first visual representation of a first data extraction flow, the first data extraction flow defining a first object-relationship template comprising a first set of object-relationships used to create a first dataset from the data source;
   searching, with one or more hardware processors, an object relationship template repository maintained in a database for one or more object-relationship templates that reference the first object-relationship template to generate, with the one or more hardware processors, a list of object-relationship templates that reference the first object relationship template;
   displaying, on the display interface, for an object appearing in the first visual representation of the data extraction flow, the list of object-relationship templates that reference the first object-relationship;
   in response to user input, selecting, with one or more hardware processors, at least a second object-relationship template from the list of object-relationship templates maintained in the database referencing the first object-relationship template;
   combining, with the one or more hardware processors, the first object-relationship template with the at least the second object-relationship template to form an updated visual representation of a second data extraction flow, different from the first data extraction flow, the second data extraction flow comprising the first set of object-relationships combined with the object-relationships from the at least the selected second object-relationship template;
   displaying, on the display interface, the updated visual representation of the second data extraction flow;
   saying, in response to the user input, the updated visual representation of the second data extraction flow as a new object relationship template; and
   storing the new object relationship template in a repository, wherein the new object-relationship template is accessible based on any one of the objects referenced in the template.

2. The method of claim 1 further comprising:
   creating, in response to user input, a second dataset extracted from the data store using the second data extraction flow.

3. The method of claim 1, further comprising:
   saving, in response to user input, the updated visual representation of the second data extraction flow as an object relationship template; and
   storing the object relationship template in a repository, wherein the object-relationship template is accessible based on any one of the objects referenced in the template.

4. The method of claim 1, wherein generating an updated visual representation of the data extraction flow includes:
   generating any associated Java Script Object Notation (JSON) for the object-relationships from the at least selected second object-relationship template; and appending the JSON to a dataflow definition file representing the data extraction flow.

5. A system for extracting data from a data source, the system comprising:
a repository for storing reusable object-relationship templates, an object-relationship template containing a set of object relationships used for building a dataflow definition;
a user device having a display;
a processor in communication with the repository and the user device, the processor having instructions for building the dataflow definition, the instructions comprising:
displaying, on the display, a first visual representation of a first data extraction flow, the first data extraction flow defining a first object-relationship template comprising a first set of object-relationships used to create a first dataset from the data source;
searching, with one or more hardware processors, an object relationship template repository maintained in a database for one or more object-relationship templates that reference the first object-relationship template to generate, with the one or more hardware processors, a list of object-relationship templates that reference the first object relationship template;
displaying, on the display, for an object appearing in the first visual representation of the data extraction flow, the list of object-relationship templates that reference the first object-relationship template;
in response to user input, selecting, with one or more hardware processors, at least a second object-relationship template from the list of object-relationship templates maintained in the database referencing the first object-relationship template;
combining, with the one or more hardware processors, the first object-relationship template with the at least the second object-relationship template to form an updated visual representation of a second data, extraction flow, different from the first data extraction flow, the second data extraction flow comprising the first set of object-relationships combined with the object-relationships from the at least the selected second object-relationship template;
displaying, on the display, the updated visual representation of the second data extraction flow;
saying, in response to the user input, the updated visual representation of the second data extraction flow as a new object relationship template; and
storing the new object relationship template in a repository, Wherein the new object-relationship template is accessible based on any one of the objects referenced in the template.

6. The system of claim 5, further comprising:
a data store in communication with the processor;
wherein the processor having instructions for creating a dataset in accordance with the dataflow definition, the instructions comprising:
extracting data from the data store in accordance with the dataflow definition; and
creating, in response to user input, a second dataset from the extracted data, the second dataset containing data for the second set of object-relationships displayed in the visual representation.

7. The system of claim 5, wherein the processor having instructions for managing the storage and selection of reusable object relationship templates, the instructions comprising:

saving, in response to user input, the visual representation of the second data extraction flow as an object relationship template; and
storing the second object relationship template in a repository, wherein the second object-relationship template is accessible based on any one of the objects referenced in the template.

8. The system of claim 5, wherein the instructions for building the dataflow definition from the updated set of object relationships displayed in the visual representation further comprising:
generating any associated Java Script Object Notation (JSON) for the object-relationships contained in the at least selected second object-relationship templates; and
appending the JSON to a dataflow definition file corresponding to the updated visual representation of the updated set of object relationships.

9. An article of manufacture comprising a computer readable storage medium having content stored thereon, Which when executed, cause a machine to perform operations including:
in a device having a display interface, the device in communication with a data store:
displaying, on the display interface, a first visual representation of a first data extraction flow, the first data extraction flow defining a first object-relationship template comprising a first set of object-relationships used to create a first dataset from the data source;
searching, with one or more hardware processors, an object relationship template repository maintained in a database for one or more object-relationship templates that reference the first object-relationship template to generate, with the one or more hardware processors, a list of object-relationship templates that reference the first object relationship template;
displaying, on the display interface, for an object appearing in the first visual representation of the data extraction flow, the list of object-relationship templates that reference the first object-relationship template;
in response to user input, selecting, with one or more hardware processors, at least a second object-relationship template from the list of object-relationship templates maintained in the database referencing the first object-relationship template;
combining, with the one or more hardware processors, the first object-relationship template with the at least Hall the second object-relationship template to form an updated visual representation of a second data extraction flow, different from the first data extraction flow, the second data extraction flow comprising the first set of object-relationships combined with the object-relationships from the at least the selected second object-relationship template;
displaying, on the display interface, the updated visual representation of the second data extraction flow;
saving, in response to the user input, the updated visual representation of the second data extraction flow as a new object relationship template; and
storing the new object relationship template in a repository, Wherein the new object-relationship template is accessible based on any one of the objects referenced in the template.

10. The article of manufacture of claim 9, wherein the machine is to perform operations further including:

creating, in response to user input, a dataset extracted from the data store using the second data extraction flow.

11. The article of manufacture of claim 9, wherein the machine is to perform operations further including:
   saving, in response to user input, the visual representation of the second data extraction flow as an object relationship template; and
   storing the second object relationship template in a repository, wherein the second object-relationship template is accessible based on any one of the objects referenced in the template.

12. The article of manufacture of claim 9, wherein the operation of updating the visual representation of the data extraction flow includes:
   generating any associated Java Script Object Notation (JSON) for the object-relationships from the at least selected second object-relationship template; and
   appending the JSON to a dataflow definition file representing the data extraction flow.

* * * * *